(12) United States Patent
Deforge et al.

(10) Patent No.: US 12,375,172 B2
(45) Date of Patent: Jul. 29, 2025

(54) CUSTOM SIGNAL DATA GENERATION IN A RADIO SYSTEM

(71) Applicant: Dell Products L.P., Round Rock, TX (US)

(72) Inventors: John Bradley Deforge, Chelsea (CA); Sewvanda Don, Ottawa (CA); Tommy Ivarsson, Ottawa (CA); Mikhail Shenouda, Nepean (CA)

(73) Assignee: Dell Products L.P., Round Rock, TX (US)

( * ) Notice: Subject to any disclaimer, the term of this patent is extended or adjusted under 35 U.S.C. 154(b) by 622 days.

(21) Appl. No.: 17/660,350

(22) Filed: Apr. 22, 2022

(65) Prior Publication Data

US 2023/0344512 A1    Oct. 26, 2023

(51) Int. Cl.
    *H04W 24/08*    (2009.01)
    *H04B 7/26*     (2006.01)
    *H04W 56/00*    (2009.01)

(52) U.S. Cl.
    CPC .......... *H04B 7/2603* (2013.01); *H04W 24/08* (2013.01); *H04W 56/004* (2013.01)

(58) Field of Classification Search
    CPC ... H04H 7/2603; H04W 24/08; H04W 56/004
    USPC .................................................. 370/329, 400
    See application file for complete search history.

(56) References Cited

U.S. PATENT DOCUMENTS

| | | | |
|---|---|---|---|
| 7,362,800 B1 | 4/2008 | Zerbe et al. | |
| 2008/0043860 A1 | 2/2008 | Moffatt | |
| 2013/0122825 A1 | 5/2013 | Deforge et al. | |
| 2014/0362955 A1 | 12/2014 | Muhammad | |
| 2016/0197684 A1 | 7/2016 | Tsai et al. | |
| 2017/0207884 A1 | 7/2017 | Jiang et al. | |
| 2020/0343985 A1 | 10/2020 | O'Shea et al. | |
| 2022/0209805 A1 | 6/2022 | Yu et al. | |

(Continued)

FOREIGN PATENT DOCUMENTS

CN      114185767 A     3/2022

OTHER PUBLICATIONS

International Search Report and Written Opinion mailed Apr. 24, 2023 for PCT Application No. PCT/US2022/053290, 14 pages.

(Continued)

*Primary Examiner* — Dang T Ton
(74) *Attorney, Agent, or Firm* — Amin, Turocy & Watson, LLP

(57) ABSTRACT

A system can comprise a memory that is configured to store and retrieve a first signal. The system can further comprise a generator that is configured to generate first in-phase, quadrature sub-carrier values. The system can further comprise a look up table that stores predetermined second in-phase, quadrature sub-carrier values. The system can further comprise a pseudo-random look up table generator that is configured to operate on the predetermined second in-phase, quadrature sub-carrier values to produce a pseudo-random symbol of data values. The system can further comprise a component that is configured to time align, buffer, and inject a second signal into a radio used by the system, wherein the second signal is selected from the memory, the generator, the look up table, and the pseudo-random look up table generator.

20 Claims, 17 Drawing Sheets

(56) References Cited

U.S. PATENT DOCUMENTS

2022/0271782 A1   8/2022   Arditti Ilitzky et al.
2023/0353174 A1*  11/2023  Deforge .................. H04B 1/04

OTHER PUBLICATIONS

Office Action mailed Oct. 31, 2023 for U.S. Appl. No. 17/733,639, 33 pages.
Invitation to Pay Additional Fees for PCT Application No. PCT/US2022/053281 mailed Apr. 24, 2023, 14 pages.
International Search Report and Written Opinion for PCT Application No. PCT/US2022/053281 mailed Jun. 16, 2023, 21 pages.
Notice of Allowance mailed Feb. 20, 2024 for U.S. Appl. No. 17/733,639, 44 pages.
Notification Concerning Transmittal of International Preliminary Report on Patentablility mailed Nov. 7, 2024 for PCT Application No. PCT/US2022/053290, 9 pages.
European Office Action mailed Dec. 6, 2024 for European Patent Application No. 22854480.5, 3 pages.
Notification Concerning Transmittal of International Preliminary Report on Patentablility mailed Oct. 31, 2024 for PCT Application No. PCT/US2022/053281, 14 pages.
European Office Action mailed Nov. 29, 2024 for European Patent Application No. 22851203.4, 3 pages.

\* cited by examiner

1100

( 1102 )

SELECTING A FIRST SIGNAL FROM A MEMORY THAT IS CONFIGURED TO STORE AND RETRIEVE A SECOND SIGNAL, A GENERATOR THAT IS CONFIGURED TO GENERATE FIRST IN-PHASE, QUADRATURE SUB-CARRIER VALUES, A LOOK UP TABLE THAT STORES PREDETERMINED SECOND IN-PHASE, QUADRATURE SUB-CARRIER VALUES, AND A PSEUDO-RANDOM LOOK UP TABLE GENERATOR THAT IS CONFIGURED TO OPERATE ON THE PREDETERMINED SECOND IN-PHASE, QUADRATURE SUB-CARRIER VALUES TO PRODUCE A PSEUDO-RANDOM SYMBOL OF DATA VALUES 1104

INJECTING THE FIRST SIGNAL INTO A RADIO SYSTEM 1106

READING A THIRD SIGNAL FROM THE RADIO SYSTEM, WHEREIN THE THIRD SIGNAL IS GENERATED BASED ON THE FIRST SIGNAL 1304

DETERMINING A PERFORMANCE METRIC OF THE RADIO SYSTEM BASED ON A COMPARISON OF THE FIRST SIGNAL AND THE THIRD SIGNAL 1306

CUSTOM SIGNAL DATA GENERATION IN A RADIO SYSTEM

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a memory that is configured to store and retrieve a first signal. The system can further comprise a generator that is configured to generate first in-phase, quadrature sub-carrier values. The system can further comprise a look up table that stores predetermined second in-phase, quadrature sub-carrier values. The system can further comprise a pseudo-random look up table generator that is configured to operate on the predetermined second in-phase, quadrature sub-carrier values to produce a pseudo-random symbol of data values. The system can further comprise a component that is configured to time align, buffer, and inject a second signal into a radio used by the system, wherein the second signal is selected from the memory, the generator, the look up table, and the pseudo-random look up table generator.

An example method can comprise selecting, by a system comprising a processor, a first signal from, a memory that is configured to store and retrieve a second signal; a generator that is configured to generate first in-phase, quadrature sub-carrier values; a look up table that stores predetermined second in-phase, quadrature sub-carrier values; and a pseudo-random look up table generator that is configured to operate on the predetermined second in-phase, quadrature sub-carrier values to produce a pseudo-random symbol of data values. The method can further comprise injecting, by the system, the first signal into a radio.

An example apparatus can comprise a radio system. The apparatus can further comprise a signal generation component configured to generate a first signal, wherein the first signal is separate from a second signal that comprises live-air data. The apparatus can further comprise a signal insertion component that is configured to insert the first signal into the radio system. The apparatus can further comprise a performance evaluation component that is configured to evaluate performance of the radio system based on a transformation of the first signal performed by the radio system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 11 illustrates an example process flow that can facilitate custom signal data generation in a radio system, in accordance with an embodiment of this disclosure;

FIG. 13 illustrates another example process flow that can facilitate custom signal data generation in a radio system, in accordance with an embodiment of this disclosure;

DETAILED DESCRIPTION

Overview

Figure 1:
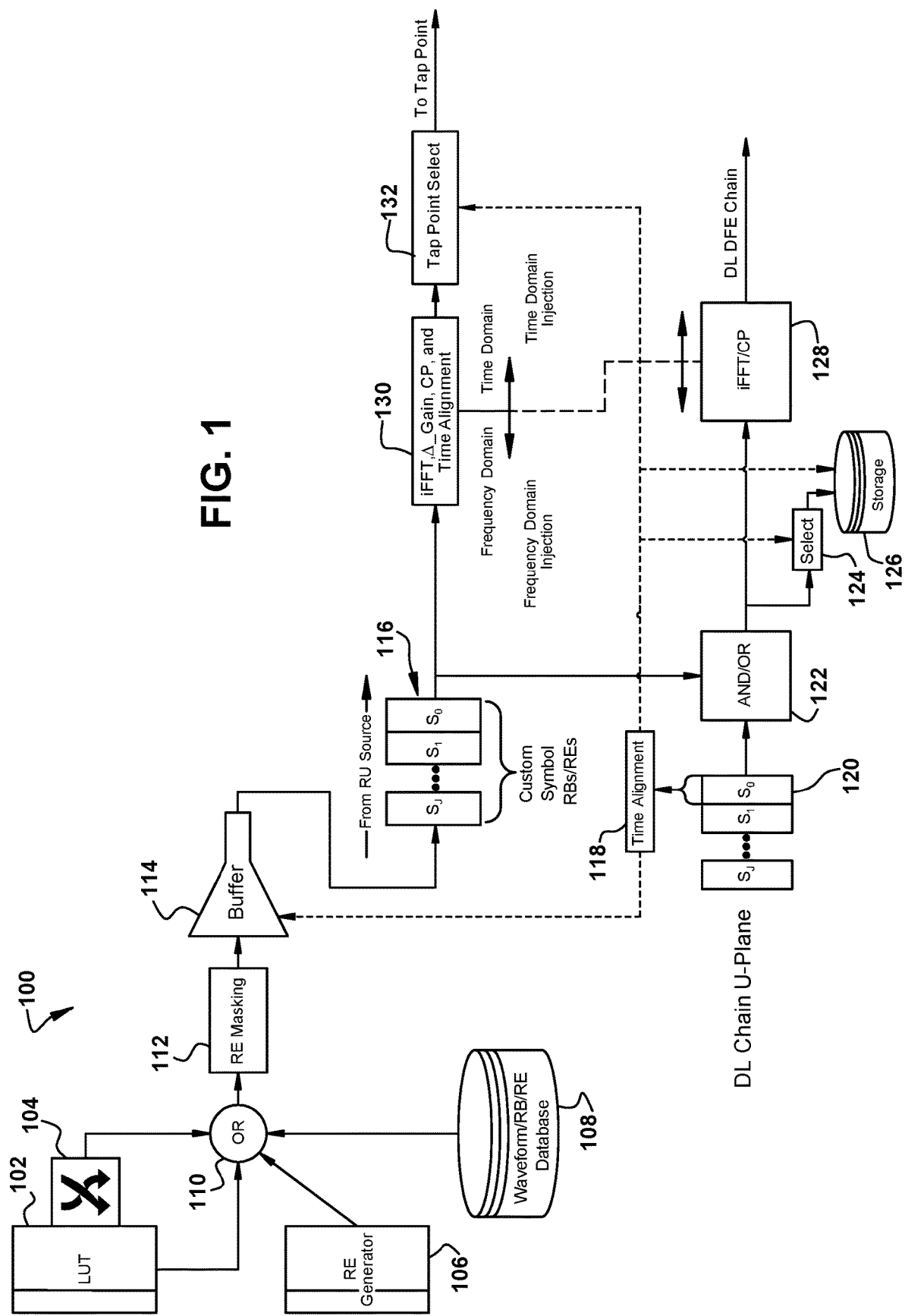
FIG. 1 illustrates an example system architecture that can facilitate custom signal data generation in a radio system, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

An ability to generate customized signal data and inject into a radio's signal chain can be tantamount to an ability to further capture and derive key performance data from radio sub-systems. According to the present techniques, and analogous to custom waveforms from a signal generator, a custom signal can be injected or added to mission mode signals to become a custom hybrid of mission mode signal data. Custom signals, or signals independent of mission mode signals (that is, non-mission mode signals) can also be generated. Custom signal data can, in many instances, be statistically equivalent to mission mode data. In some examples according to the present techniques, mission mode data can be used as if it were custom data.

An ability to read, record and recall data for further analysis can facilitate a deeper understanding of system performance (among other things), and can be further used to determine improved performance aspects of system operation, maintenance, and customer experience (among other things).

The present techniques can be implemented for creation and injection of custom waveforms into a u-plane of a system. In prior approaches, it can be that an ability to inject signals is not part of a normal signal data path. In an example, this signal injection can occur at a distributed unit of a radio. In another example, this signal injection can occur at a radio unit of a radio.

Custom data according to the present techniques can be originated in several ways, including the following. A memory that is onboard to the radio can be configured to temporally play a suitable waveform or noise-like signal. A dynamic resource block/resource element RB/RE allocation can be configured to generate between 1 and 4,096 (or other) inphase and quadrature (I+Q) 16 bit (signed) data pairs of arbitrary sub-carrier values for a given desired modulation coding scheme (MCS). Such a dynamic RB/RE allocation can be operated as a Moore machine or a Mealy machine.

A look up table can be configured to store predetermined I/Q data values, which are each able to represent a component of a constellation of a given MCS level. Look up table data can be played in order, or randomized to be playable in any order. In some examples, a look up table can fulfill a given constellation/MCS symbol map and a predetermined complementary cumulative distribution function (CCDF). A signal from a look up table can be a one-tone signal or a multi-tone signal.

A pseudo-random look up table generator can operate in conjunction with a look up table. A pseudo-random look up table generator can comprise a block that operates on the look up table's I/Q data and produces a pseudo random symbol of data values of suitable random distribution. Values can be selected from the look up table in a random fashion to fulfill a symbol (e.g., a complete RB matrix) of signal data).

In examples according to the present techniques, custom signals can be injected into a radio unit, a distributed unit, or both a radio unit and a distributed unit, in a frequency domain of the radio. In some examples, custom signals can be injected into each of a radio unit and a distributed unit in a frequency domain, as well as be injected into the radio unit in a time domain.

A custom signal can be mapped to a specific location in a RB matrix, such as by deterministic means or by use of a mask. Custom signal data can be provided on a single discrete period basis on a smallest system time interval of a radio. In some examples, a time boundary can be 1 symbol period. Custom signal data can be synchronized with typical system time boundaries.

The present techniques can be implemented to provide synchronization information to a capture mechanism to facilitate proper integration over discrete system time boundaries.

In some examples, data can be added to mission mode data to create a hybrid of mission and custom data. In some examples, data can be custom-only data (that is, non-mission mode). In some examples, data can be mission mode data.

Regarding dimensioning, 1 I+Q bit can be equivalent to 1 resource element/sub-carrier in a frequency domain. In an example, there can be up to 4,096 resource elements of I+Q, up to 16 bits (signed data pairs). In an example, data generated for a radio unit can support masking so that all, or a subset, of the 0 to 4,095 resource elements available can either be passed to, or removed from, a data stream the AND/OR block. In some examples, a mask can be enabled or disabled, where a disabled mask is a pass-through state.

MCSes can be available as supported by radio requirements. Data can be triggered and time aligned with system timing on a symbol by symbol basis. In some examples, data can be triggered and time aligned based on other relevant system time boundaries.

In some examples, data AND/OR blocks can be implemented for selecting a source of data. A distributed unit can provision one resource, or a plurality of resources, of signal data available to radio unit sourced signal data for injection of custom data. Data can be sourced purely from a distributed unit mission mode u-plane path source (that is, the data can be mission mode data). Data can be sourced purely from sources internal to a radio unit, and injected into the u-plane data path (that is, the data can be non-mission mode data). These sources can include a memory, a dynamic RB/RE generator, a look up table, and a pseudo-random look up table, with or without a mask enabled. Data can be sourced from a combination of both sources for a distributed unit and radio unit u-plane (That is, the data can be a hybrid of mission mode data and non-mission mode data).

In some prior approaches, an engineering team might conclude that implementing the present techniques would be too costly to add to a production level product. However, in fact, implementing the present techniques can create a cost savings in production.

Using a signal generation block/digital front end topology can be a component of a scenario that can reduce or eliminate the use of traditional factory test instruments and test bed. This can lead to a cost of manufacturing savings that exceeds a cost of implementing the present techniques.

It can be that testing analog circuitry and a digital block to which the analog circuitry interfaces requires a predictable, fixed, or somewhat known environment to yield repeatable and deterministic results. A radio that possesses wholly-internal signal generation, based in digital, passed (or transmitted) to analog, and further looped back to digital paths (internal to the radio, and without a need for external instruments, fixtures, or modification thereof) can produce repeatable results.

Additionally, measured results according to the present techniques, following a transformation through a radio unit, can be more repeatable, and this signal generation for test/self-test functionality can travel with the radio to the field. This can be due to a wholly-internal nature of signal generation and a subsequent ability to capture after passing through a transfer function that is the radio's sub blocks.

An ability to intricately design a waveform and inject it into the signal path can be used to derive specific performance measurement parameters, which can facilitate real-time modifications to operational parameters.

Using the present techniques, injecting custom signals into unused resource blocks (for example), can facilitate making highly precise and discrete assessments of performance on the fly during live-air periods. An ability, in the frequency domain, shift injected signals in frequency on a symbol-by-symbol basis can be used to assess performance of a radio unit's operational frequency bands.

Signal injection at a radio system level (beyond a radio unit) can provide an ability to take this feature that can be targeted to a radio unit, and deploy this system performance/measurement capability on a distributed unit for use with a wide array of corresponding radio units.

Digital circuitry can be deterministic, where an output is a combination of an input and a transfer function. Radiofrequency or analog circuitry can change with environmental conditions. However, where the stimulus is unchanging, and the capture technique is unchanging, then it can be that the only variable is the circuitry under test. Environmental changes can be predictable and/or characterizable for a given circuit—and thereby predictable to a reasonable degree. For a given input, and re-using a same capture apparatus, a functional circuit can be deterministic to a reasonable degree given normal operating conditions and operational state.

It can be that calibration is performed at any time—that is, it can be that the relative data collected on a radio does not change over time providing that a fault condition has not developed—and if a fault condition does develop, relative comparative tests can show a performance change. Additionally, relative tests can show results of aging through a radio's lifetime.

It can be a problem to build a radio that meets these specifications and requirements of a target employment, and is able to inject a signal and test. The present techniques can overcome this problem by providing for a device under test (DUT) that is its own test set, and is capable of performing tests internally.

Deviations from normal operations can relate to knowable or determinable mechanisms: software (SW), firmware (FW), hardware (HW), or operational-state error, or a change in operations due to an external influence like a failure or fault in the operational circuit. Knowable or determinable causality can be derived from tests evaluated by/from a perspective of a design engineer or artificial intelligence (AI)/machine learning (ML) agent, whereby a fault or failure can be characterizable and knowable where a sufficient suite of tests is performed, and results are analyzed.

Where a digital twin is extended to a cloud-based platform, real-time and historical data over a lifespan of a population of radios in the field can be assessed. A refinement of a characterization can become increasingly deterministic over time.

In sum, a complexity of adding signal injection to an analog loopback circuit can unlock a repeatable, reproducible, and/or field-testable radio that is capable of producing laboratory-level complexity test results that can be repeatable throughout a lifetime of a fielded radio unit, that are deterministic. By association, a suite of tests, commands, and/or stimuli can also be refined to become deterministic.

Example Architectures

FIG. 1 illustrates an example system architecture 100 that can facilitate custom signal data generation in a radio system, in accordance with an embodiment of this disclosure. System architecture 100 can generally comprise a system architecture for custom signal injection into a radio unit of a radio system.

System architecture 100 comprises look up table 102; pseudo-random look up table generator 104; generator 106; memory 108; OR 110 (in some embodiments this can be an AND gate and/or an OR gate); masking 112; buffer 114; custom symbol resource blocks/resource elements (RBs/REs) 116; time alignment 118; custom symbol RBs/REs 120; AND/OR 122; select 124; storage 126; inverse Fast Fourier Transform (iFFT)/cyclic prefix (CP) 128; inverse Fast Fourier Transform (iFFT) 130 (which can also perform Δ gain, cyclic prefix insertion, and time alignment); and tap point select 132.

In some examples, look up table 102 can store predetermined second in-phase, quadrature sub-carrier values represent respective components of a constellation of a respective modulation coding scheme level. In some examples, pseudo random look up table generator 104 is configured to select values from the look up table randomly to generate a resource block matrix symbol of signal data.

In some examples, generator 106 is configured to generate signed data pairs of arbitrary sub carrier values for a selected multi carrier system.

Generally, look up table 102; pseudo-random look up table generator 104; generator 106; and memory 108 can provide different types of signal creation. OR 110 facilitates combining these different signals (or using one signal). Masking 112 can facilitate tailoring a signal in an efficient time fashion. Buffer 114 can facilitate holding the custom signal data back until a precise time at which is to be injected (such as at AND/OR 122). Time alignment 118 can provide precise time gating and triggering for buffer 114 to ensure that the signal is available at the correct time, and only for that time.

In some examples, a custom signal can be generated with a combination of look up table 102; pseudo-random look up table generator 104; generator 106; memory 108; and/or OR 110. This signal can be passed to masking 112 where it is selectively masked. The masked signal can be passed to buffer 114 where it is buffered. Time alignment 118 can time align the buffered signal at 114 so that the custom signal is injected at a time boundary of the radio system.

Then, where a radio system comprises multiple tap points to choose from for injecting the custom signal, tap point select 132 can select a particular tap point of the radio system and the custom signal can be injected at that tap point.

Figure 2:
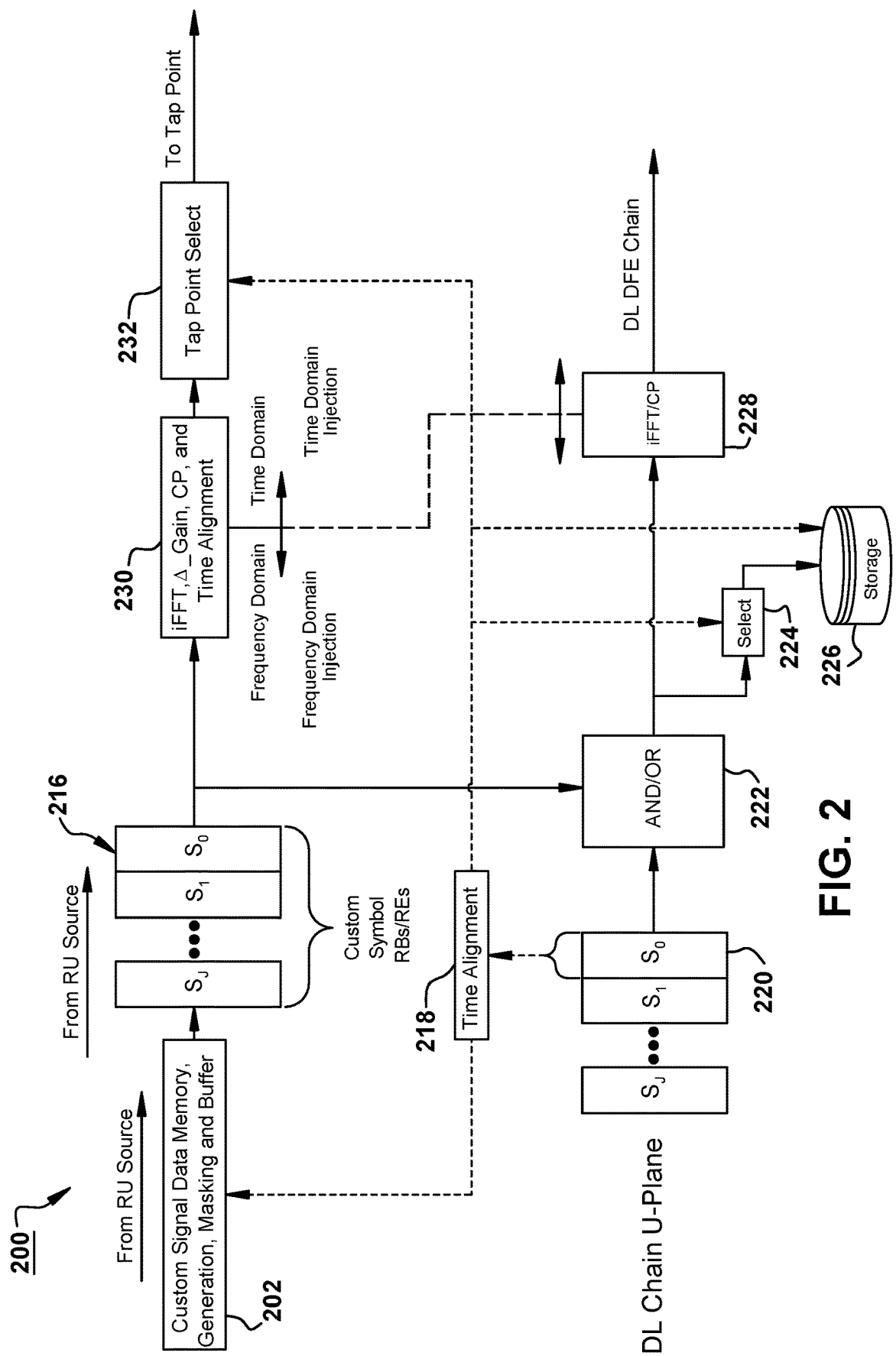
FIG. 2 illustrates another example system architecture that can facilitate custom signal data generation in a radio system, in accordance with an embodiment of this disclosure.

FIG. 2 illustrates another example system architecture 200 that can facilitate custom signal data generation in a radio system, in accordance with an embodiment of this disclosure. System architecture 200 can generally comprise a system architecture for custom signal injection into a radio unit of a radio system. In some examples, system architecture 200 can represent a logically simplified version of system architecture 100 of FIG. 1.

System architecture 200 comprises custom signal data memory, generation, masking, and buffer 202; custom symbol resource blocks/resource elements (RBs/REs) 216; time alignment 218; custom symbol RBs/REs 220; AND/OR 222; select 224; storage 226; inverse Fast Fourier Transform (iFFT)/cyclic prefix (CP) 228; inverse Fast Fourier Transform (iFFT) 230 (which can also perform Δ gain, cyclic prefix insertion, and time alignment); and tap point select 232.

In some examples, custom signal data memory, generation, masking, and buffer 202 can be similar to a combination of look up table 102; pseudo-random look up table generator 104; generator 106; memory 108; OR 110 (in some embodiments this can be an AND gate and/or an OR gate); masking 112; and buffer 114 of FIG. 1.

In some examples, custom symbol resource blocks/resource elements (RBs/REs) 216; time alignment 218; custom symbol RBs/REs 220; AND/OR 222; select 224; storage 226; inverse Fast Fourier Transform (iFFT)/cyclic prefix (CP) 228; inverse Fast Fourier Transform (iFFT) 230 (which can also perform Δ gain, cyclic prefix insertion, and time alignment); and tap point select 232 can be similar to custom symbol resource blocks/resource elements (RBs/REs) 116; time alignment 118; custom symbol RBs/REs 120; AND/OR 122; select 124; storage 126; inverse Fast Fourier Transform (iFFT)/cyclic prefix (CP) 128; inverse Fast Fourier Transform (iFFT) 130 (which can also perform Δ gain, cyclic prefix insertion, and time alignment); and tap point select 132 of FIG. 1, respectively.

In some examples, custom signal data memory, generation, masking, and buffer 202. Custom signal data memory, generation, masking, and buffer 202 can also mask, buffer, and time align this signal (in conjunction with time alignment 218).

Then, where a radio system comprises multiple tap points to choose from for injecting the custom signal, tap point select 232 can select a particular tap point of the radio system and the custom signal can be injected at that tap point.

Figure 3:
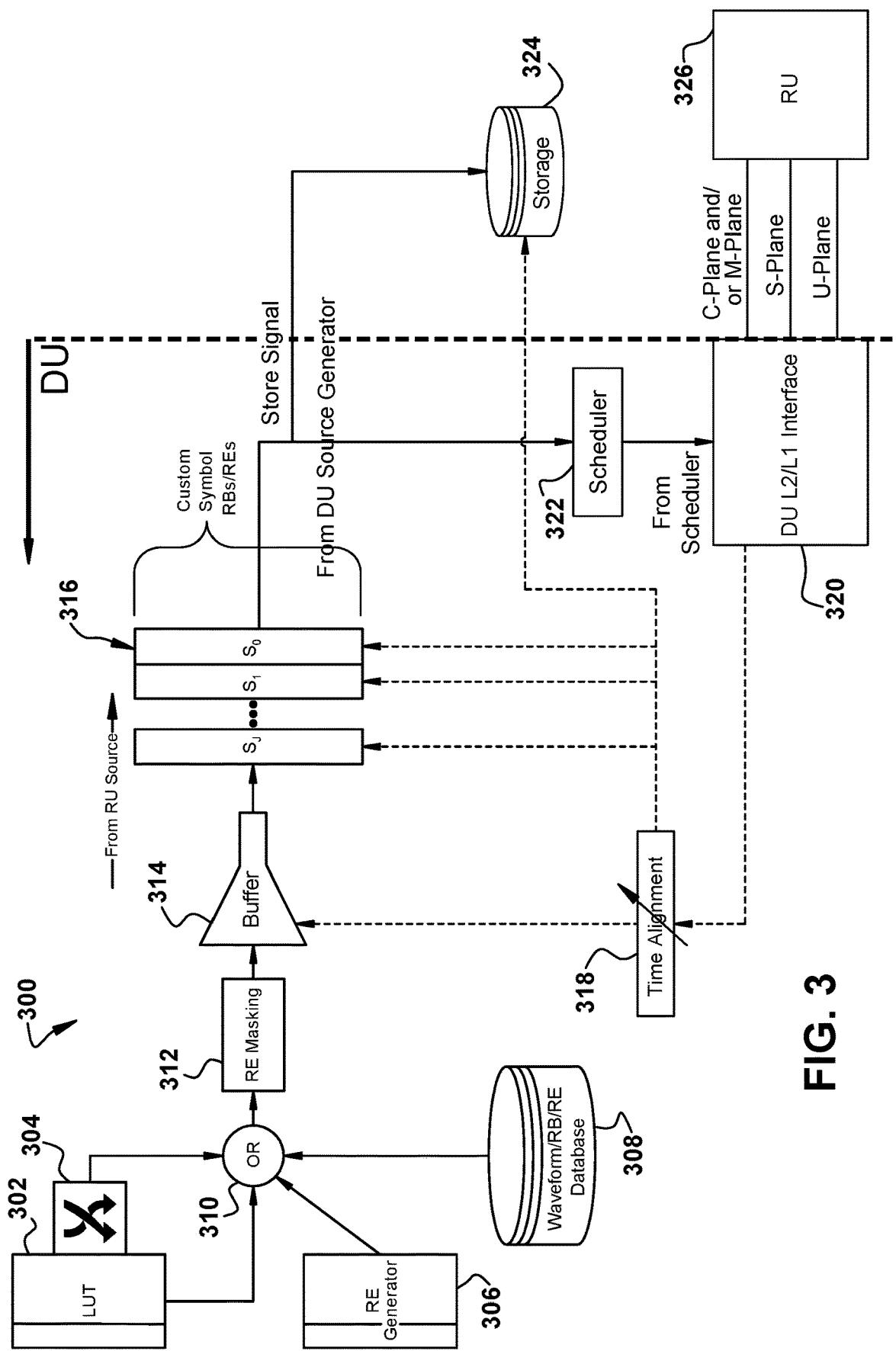
FIG. 3 illustrates another example system architecture that can facilitate custom signal data generation in a radio system, in accordance with an embodiment of this disclosure.

FIG. 3 illustrates another example system architecture 300 that can facilitate custom signal data generation in a radio system, in accordance with an embodiment of this disclosure. System architecture 300 can generally comprise a system architecture for custom signal injection into a distributed unit of a radio system.

System architecture 300 comprises look up table 302; pseudo-random look up table generator 304; generator 306; memory 308; OR 310 (in some embodiments this can be an AND gate and/or an OR gate); masking 312; buffer 314; custom symbol resource blocks/resource elements (RBs/REs) 316; time alignment 318; distributed unit (DU) L2/L1 interface 320; scheduler 322; storage 324; and radio unit (RU) 326.

In some examples, look up table 302; pseudo-random look up table generator 304; generator 306; memory 308; OR 310 (in some embodiments this can be an AND gate and/or an OR gate); masking 312; buffer 314; custom symbol resource blocks/resource elements (RBs/REs) 316; and time alignment 318 can be similar to look up table 102; pseudo-random look up table generator 104; generator 106; memory 108; OR 110 (in some embodiments this can be an AND gate and/or an OR gate); masking 112; buffer 114; custom symbol resource blocks/resource elements (RBs/REs) 116; time alignment 118, respectively, of FIG. 1.

In some examples, a custom signal can be generated with a combination of look up table 302; pseudo-random look up table generator 304; generator 306; memory 308; and/or OR 310. This signal can be passed to masking 312 where it is selectively masked. The masked signal can be passed to buffer 314 where it is buffered. Time alignment 318 can time align the buffered signal at 314 so that the custom signal can be injected at a time boundary of the radio system into scheduler 322 (or stored in storage 324).

Figure 4:
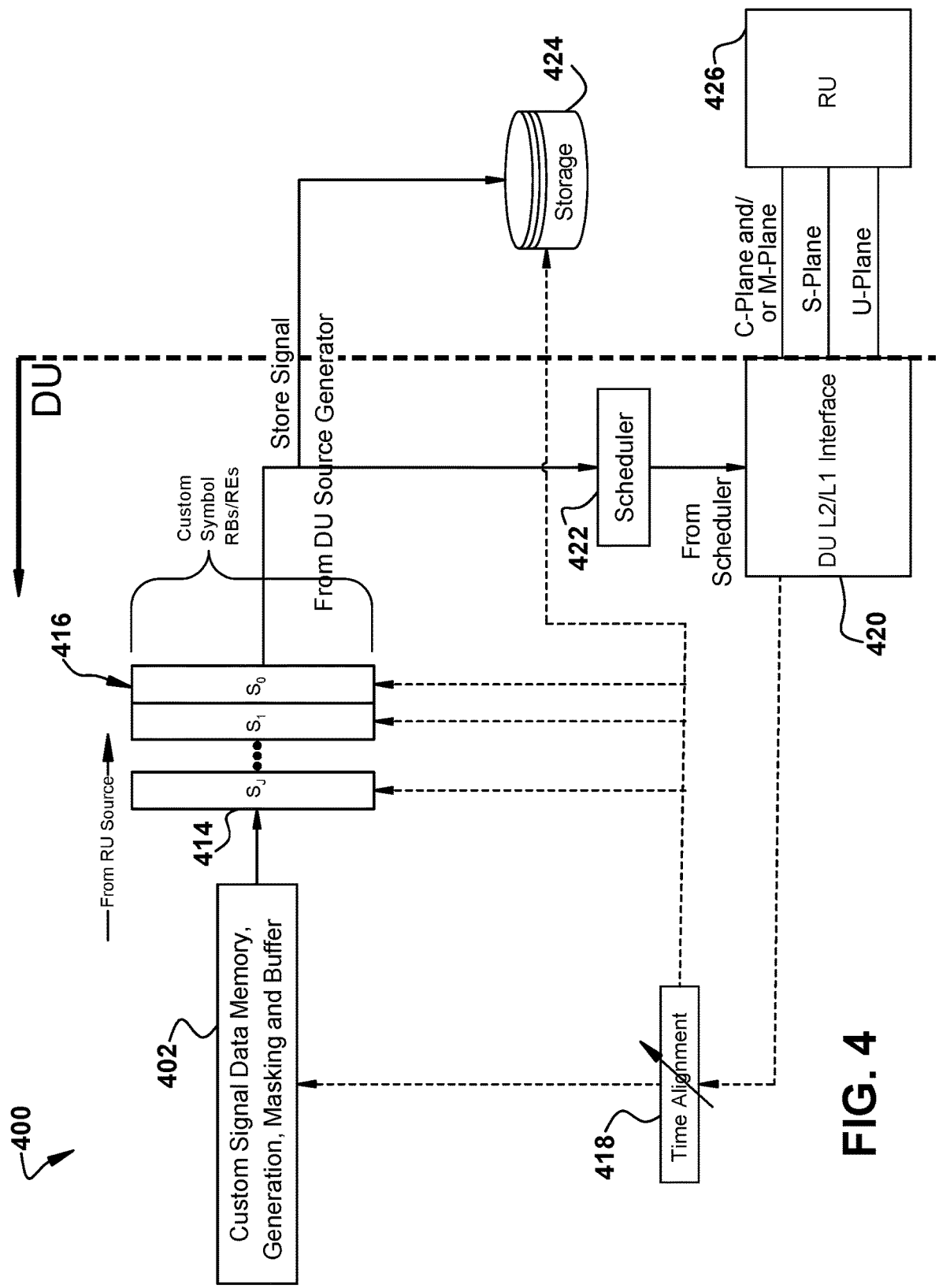
FIG. 4 illustrates another example system architecture that can facilitate custom signal data generation in a radio system, in accordance with an embodiment of this disclosure.
Figure 5A:
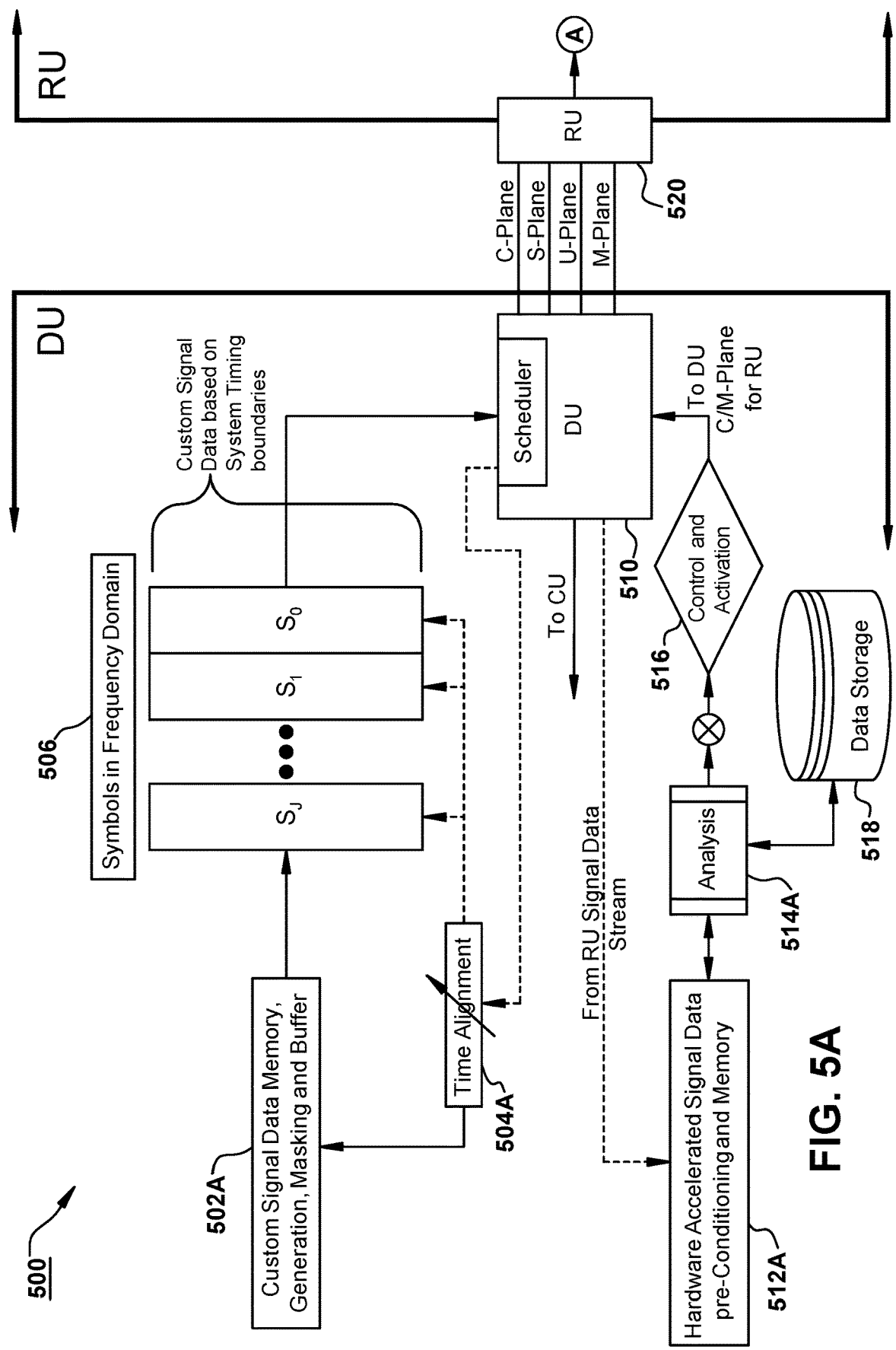
FIG. 5A, FIG. 5B, FIG. 5C, and FIG. 5D illustrate an example system architecture of a distributed unit and a radio unit of a radio system, and that can facilitate custom signal data generation in a radio system, in accordance with an embodiment of this disclosure.
Figure 5B:
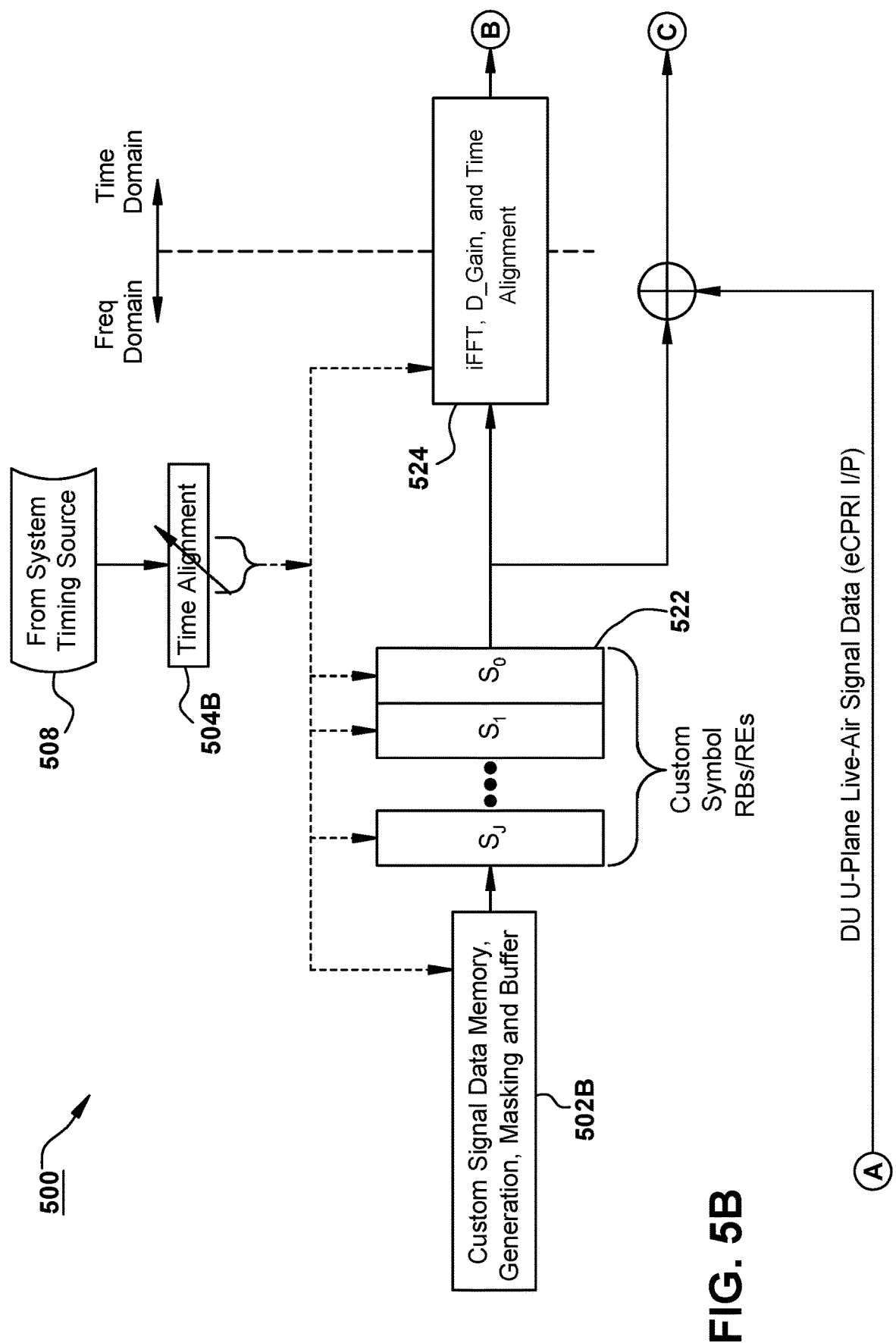
Figure 5C:
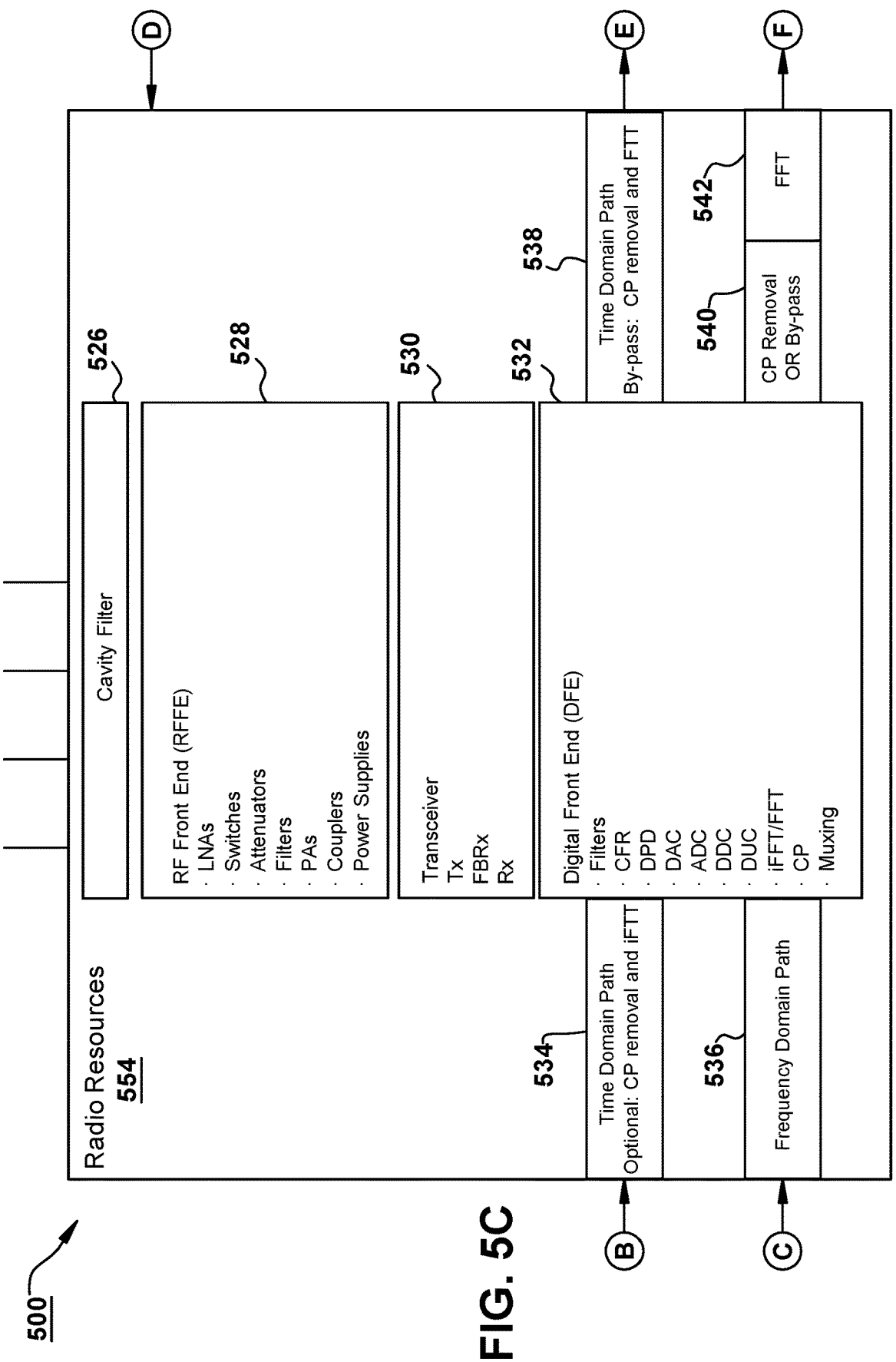
Figure 5D:
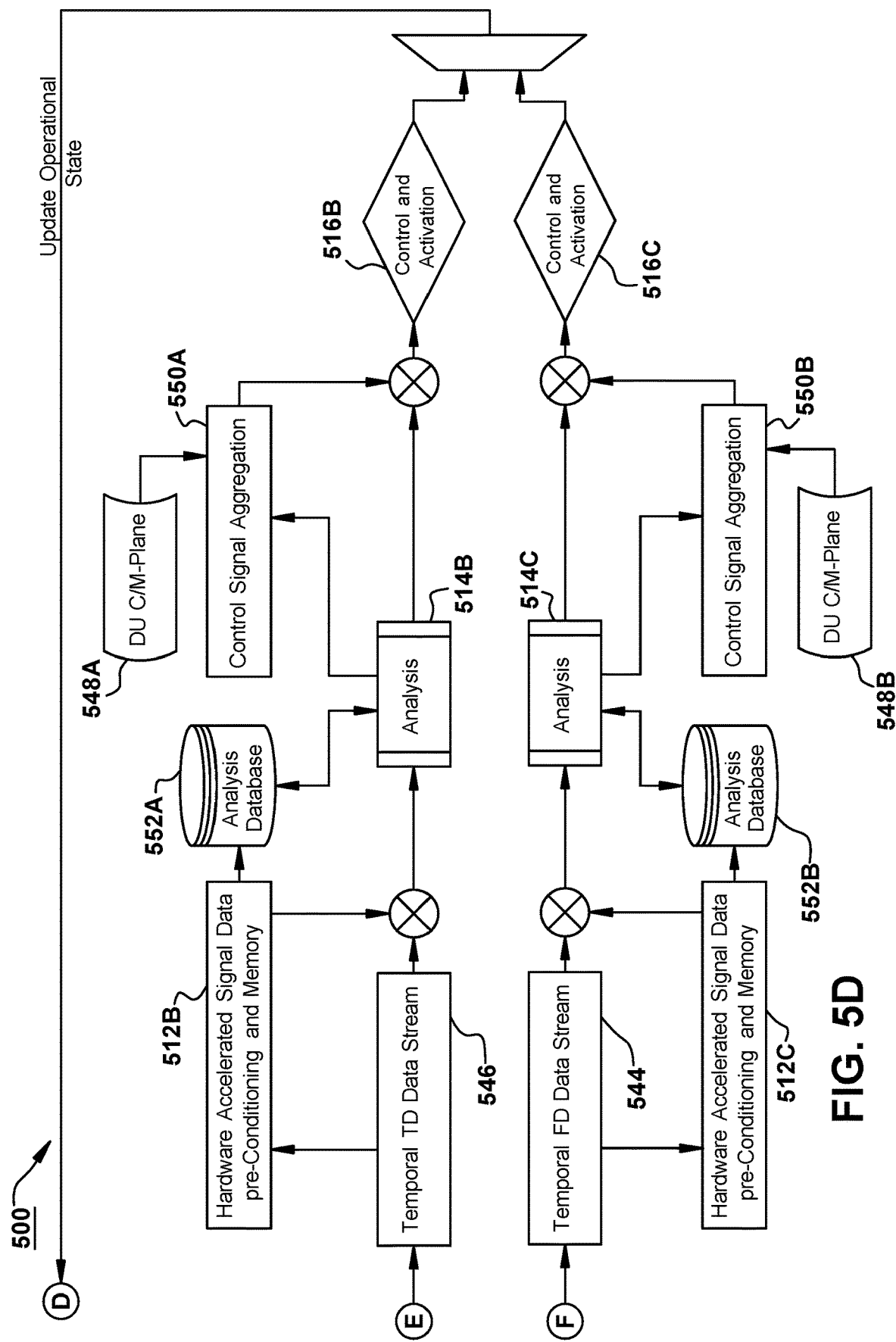

FIG. 4 illustrates another example system architecture 400 that can facilitate custom signal data generation in a radio system, in accordance with an embodiment of this disclosure. System architecture 400 can generally comprise a system architecture for custom signal injection into a radio unit of a radio system. In some examples, system architecture 400 can represent a logically simplified version of system architecture 300 of FIG. 3.

System architecture 400 comprises custom signal data memory, generation, masking, and buffer 402; custom symbol resource blocks/resource elements (RBs/REs) 416; time alignment 418; distributed unit (DU) L2/L1 interface 420; scheduler 422; storage 424; and radio unit (RU) 426.

In some examples, custom signal data memory, generation, masking, and buffer 402 can be similar to a combination of look up table 302; pseudo-random look up table generator 304; generator 306; memory 308; OR 310 (in some embodiments this can be an AND gate and/or an OR gate); masking 312; and buffer 314 of FIG. 3.

In some examples, custom symbol resource blocks/resource elements (RBs/REs) 416; time alignment 418; custom symbol RBs/REs 420; AND/OR 422; storage 424; and RU 426 can be similar to custom symbol resource blocks/resource elements (RBs/REs) 316; time alignment 318; custom symbol RBs/REs 320; AND/OR 322; storage 324; and RU 326 of FIG. 3, respectively.

In some examples, custom signal data memory, generation, masking, and buffer 402. Custom signal data memory, generation, masking, and buffer 402 can also mask, buffer, and time align this signal (in conjunction with time alignment 418).

Then, the custom signal can be injected at a time boundary of the radio system into scheduler 422 (or stored in storage 424).

FIG. 5A, FIG. 5B, FIG. 5C, and FIG. 5D illustrate an example system architecture 500 of a distributed unit and a radio unit of a radio system, and that can facilitate custom signal data generation in a radio system, in accordance with an embodiment of this disclosure. In some examples, system architecture can comprise a radio system that can comprise part(s) of system architecture 100 of FIG. 1, system architecture 200 of FIG. 2, system architecture 300 of FIG. 3, and/or system architecture 400 of FIG. 4.

As depicted, system architecture 500 comprises custom signal data memory, generation, masking, and buffer 502A and custom signal data memory, generation, masking, and buffer 502B; time alignment 504A and time alignment 504B; custom symbol RBs/REs 506; from timing system source 508; distributed unit 510; hardware accelerated signal data, pre-conditioning and memory 512A, hardware accelerated signal data, pre-conditioning and memory 512B, and hardware accelerated signal data, pre-conditioning and memory 512C; analysis 514A, analysis 514B, and analysis 514C; control and activation 516A, control and activation 516B, and control and activation 516C; data storage 518; RU 520; custom symbol RBs/REs 522; inverse Fast Fourier Transform (iFFT) 524 (which can also perform Δ gain, cyclic prefix insertion, and time alignment); cavity filter 526; radiofrequency (RF) front end (RFFE) 528 (which can include low noise amplifiers (LNAs), switches, attenuators, filters, PAs, couplers, and power supplies); transceiver 530 (which can include Tx, FBRx, and Rx); digital front end 532 (which can include filters, CFR, DPD, a digital to analog converter (DACs), an analog to digital converter (ADC), a digital down converters (DDC), a digital up converter (DUC), and iFFT/FFT, CP, and muxing); time domain path 534 (which can bypass CP injection and iFFT); frequency domain path 536; time domain path 538 (which can bypass CP removal and FFT); CP removal or bypass 540; FFT 542; temporal frequency domain (FD) data stream 544; temporal time domain (TD) data stream 546; DU C/M-plane 548A and DU C/M-plane 548B; control system aggregation 550A and control system aggregation 550B; analysis database 552A and analysis database 552B; and radio resources 554.

Hardware accelerated signal data pre-conditioning and memory 512A, and hardware accelerated signal data pre-conditioning and memory 512C can perform frequency domain signal data detection.

Hardware accelerated signal data pre-conditioning and memory 512B can perform time domain signal data detection.

Custom signal data memory, generation, masking, and buffer 502A and custom signal data memory, generation, masking, and buffer 502B can perform signal generation at a distributed unit or a radio unit, respectively. They can perform local synchronized custom and live-air data stimulus with known characteristics. In some examples, they can operate in a frequency domain.

Analysis 514A, analysis 514B, and analysis 514C can perform signal capture data analysis. In some examples, they can implement artificial intelligence/machine learning (AI/ML) with training (such as live and stored real-time data, and statistical data). They can provide an output of a response to actuators to change operational parameters of a radio system.

Control and activation 516A, control and activation 516B, and control and activation 516C can take inputs that augment information available to an AI/ML component and output an affect to actuators of the radio system to change operational parameters.

In some examples, respective outputs of control and activation 516B and control and activation 516C can be aggregated to affect change on a radio and radio performance.

In system architecture 500, custom signals can be generated and then injected into tap points in either a DU or an RU. Regarding the DU, the custom signals can be originated from custom signal data memory, generation, masking, and buffer 502A (which can be similar to a combination of look up table 102, pseudo-random look up table generator 104, generator 106, memory 108, OR 110, masking 112, buffer 114, and time alignment 118 of FIG. 1; and/or custom signal data memory, generation, masking, and buffer 202 of FIG. 2, in conjunction with time alignment 504A). Regarding the RU, the custom signals can be originated from custom signal data memory, generation, masking, and buffer 502B (which can be similar to a combination of look up table 102, pseudo-random look up table generator 104, generator 106, memory 108, OR 110, masking 112, buffer 114, and time alignment 118 of FIG. 3, and/or custom signal data memory, generation, masking, and buffer 404 of FIG. 4, in conjunction with time alignment 504B).

Figure 6:
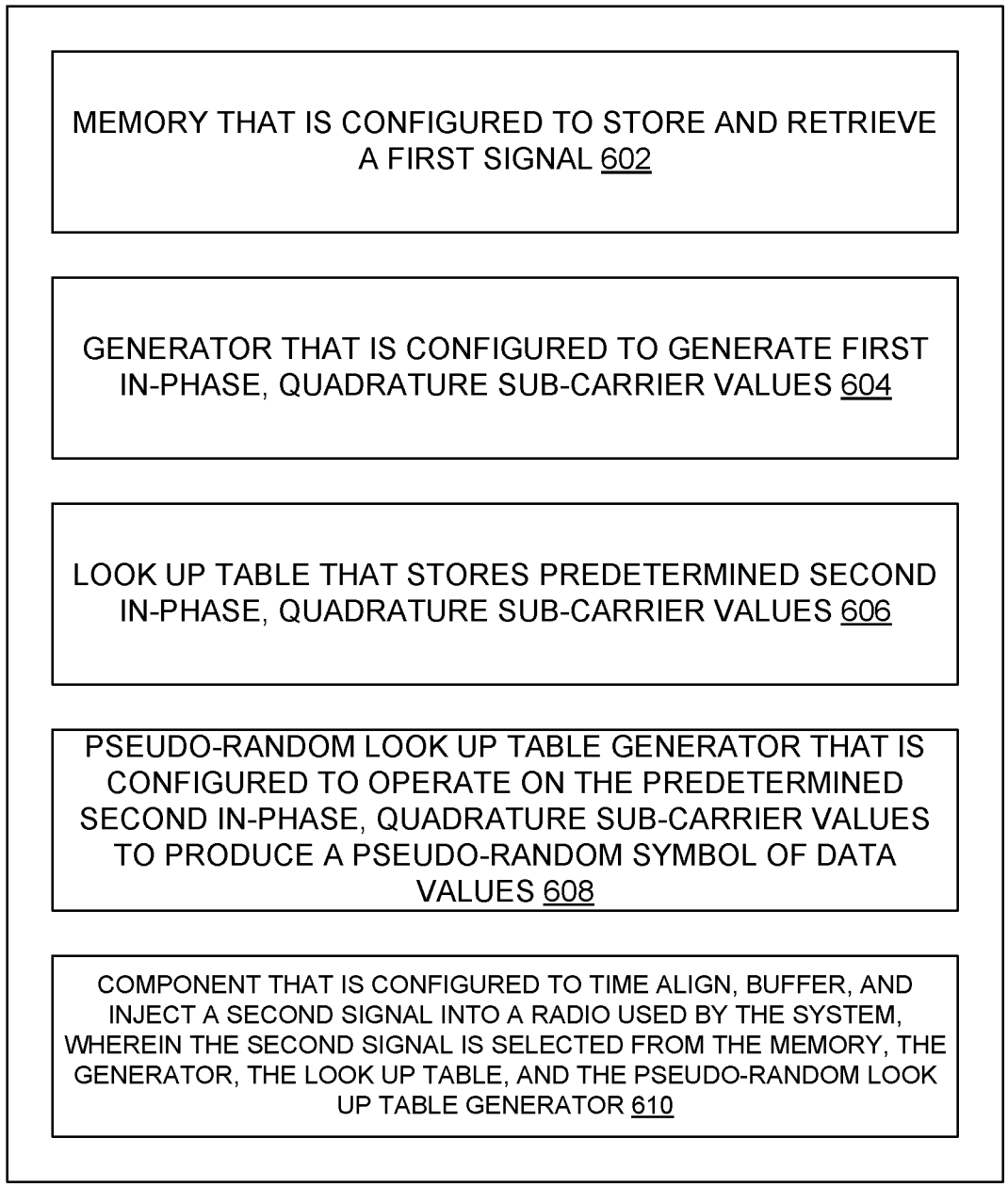
FIG. 6 illustrates another example system architecture that can facilitate custom signal data generation in a radio system, in accordance with an embodiment of this disclosure.

FIG. 6 illustrates another example system architecture 600 that can facilitate custom signal data generation in a radio system, in accordance with an embodiment of this disclosure. In some examples, part(s) of system architecture 600 can be used to implement part(s) of system architecture 100 of FIG. 1, system architecture 200 of FIG. 2, system architecture 300 of FIG. 3, system architecture 400 of FIG. 4, and/or system architecture 500 of FIGS. 5A-D.

System architecture 600 comprises memory that is configured to store and retrieve a first signal 602; generator that is configured to generate first in-phase, quadrature sub-carrier values 604; look up table that stores predetermined second in-phase, quadrature sub-carrier values 606; pseudo-random look up table generator that is configured to operate on the predetermined second in-phase, quadrature sub-carrier values to produce a pseudo-random symbol of data values 608; and component that is configured to time align, buffer, and inject a second signal into a radio used by the system, wherein the second signal is selected from the memory, the generator, the look up table, and the pseudo-random look up table generator 610.

In some examples, memory that is configured to store and retrieve a first signal 602 can be similar to memory 108 of FIG. 1, and/or memory 308 of FIG. 3. In some examples, generator that is configured to generate first in-phase, quadrature sub-carrier values 604 can be similar to generator 106 of FIG. 1, and/or generator 306 of FIG. 3. In some examples, look up table that stores predetermined second in-phase, quadrature sub-carrier values 606 can be similar to look up table 102 of FIG. 1, and/or look up table 302 of FIG. 3.

In some examples, pseudo-random look up table generator that is configured to operate on the predetermined second in-phase, quadrature sub-carrier values to produce a pseudo-random symbol of data values 608 can be similar to pseudo-random look up table generator 104 of FIG. 1, and/or pseudo-random look up table generator 304 of FIG. 3. In some examples, component that is configured to time align, buffer, and inject a second signal into a radio used by the system, wherein the second signal is selected from the memory, the generator, the look up table, and the pseudo-random look up table generator 610 can be similar to a combination of masking 112, buffer 114, time alignment 118, and or tap point select 132 of FIG. 1; and/or masking 312, buffer 134, and time alignment 318 of FIG. 3.

In some examples, the component is configured to inject the second signal at a distributed unit of the radio used by the system. That is, a custom signal can be injected into a distributed unit, such as at scheduler 322 of FIG. 3.

In some examples, the component is configured to mask at least part of the second signal before injecting the second signal into the radio. That is, the component can be similar to masking 112 of FIG. 1, and/or masking 312 of FIG. 3.

In some examples, the component is configured to align the second signal with a time boundary of the radio before injecting the second signal into the radio. That is, the component can be similar to time alignment 118 of FIG. 1, and/or time alignment 318 of FIG. 3.

Figure 7:
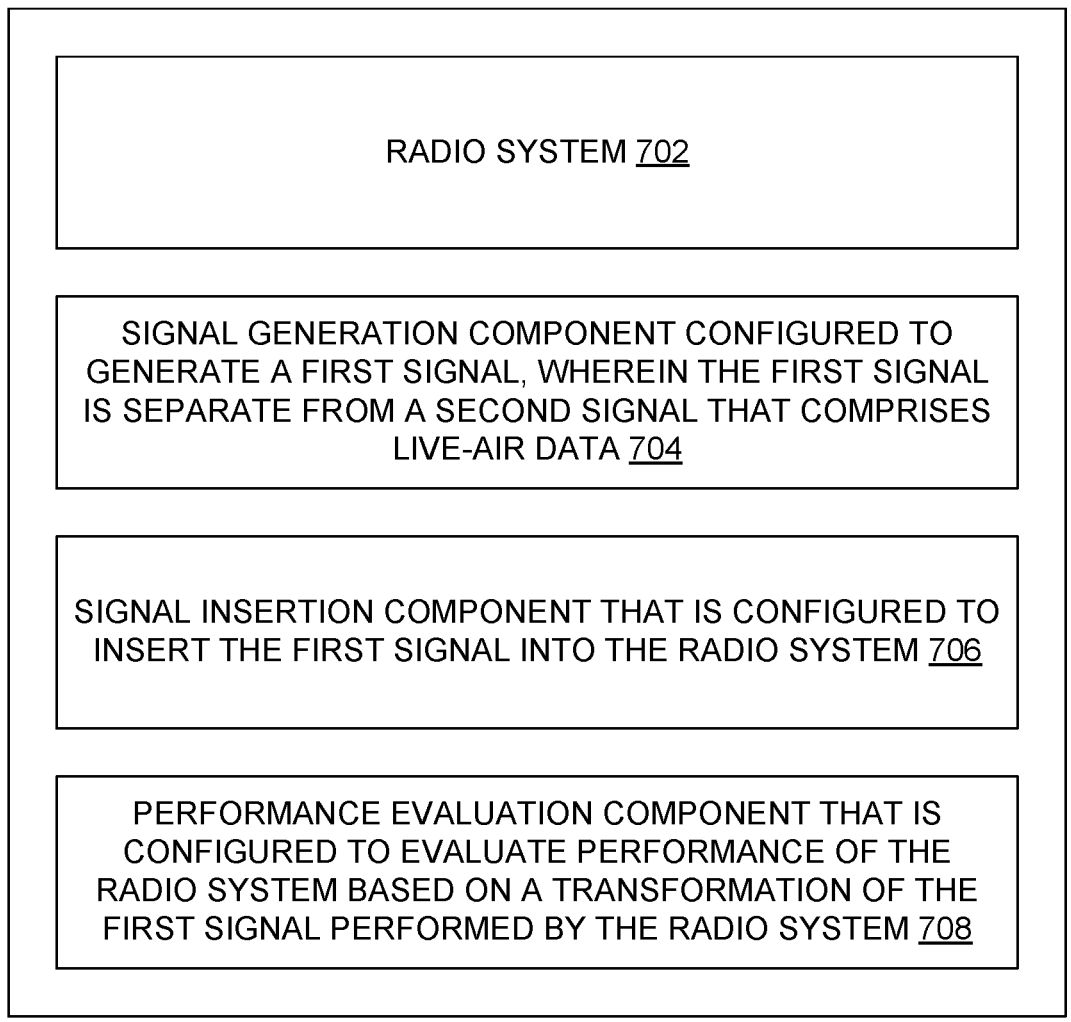
FIG. 7 illustrates another example system architecture that can facilitate custom signal data generation in a radio system, in accordance with an embodiment of this disclosure.

FIG. 7 illustrates another example system architecture 700 that can facilitate custom signal data generation in a radio system, in accordance with an embodiment of this disclosure. In some examples, part(s) of system architecture 700 can be used to implement part(s) of system architecture 100 of FIG. 1, system architecture 200 of FIG. 2, system architecture 300 of FIG. 3, system architecture 400 of FIG. 4, and/or system architecture 500 of FIGS. 5A-D.

System architecture 700 comprises radio system 702; signal generation component configured to generate a first signal, wherein the first signal is separate from a second signal that comprises live-air data 704; signal insertion component that is configured to insert the first signal into the radio system 706; and performance evaluation component that is configured to evaluate performance of the radio system based on a transformation of the first signal performed by the radio system 708.

In some examples, radio system 702 can be similar to system architecture 500 of FIGS. 5A-D. In some examples signal generation component configured to generate a first signal, wherein the first signal is separate from a second signal that comprises live-air data 704 can be similar to custom signal data memory, generation, masking, and buffer 202 of FIG. 2 and/or custom signal data memory, generation, masking, and buffer 402 of FIG. 4. In some examples, signal insertion component that is configured to insert the first signal into the radio system 706 can be similar to tap point select 132 of FIG. 1, and/or scheduler 322 of FIG. 3. In some examples, performance evaluation component that is configured to evaluate performance of the radio system based on a transformation of the first signal performed by the radio system 708 can be similar to analysis 514A, analysis 514B, and/or analysis 514C of FIGS. 5A-D.

In some examples, signal insertion component that is configured to insert the first signal into the radio system 706 is configured to insert the first signal into the radio system in a frequency domain portion of a down link stream of a distributed unit of the radio system.

Figure 8:
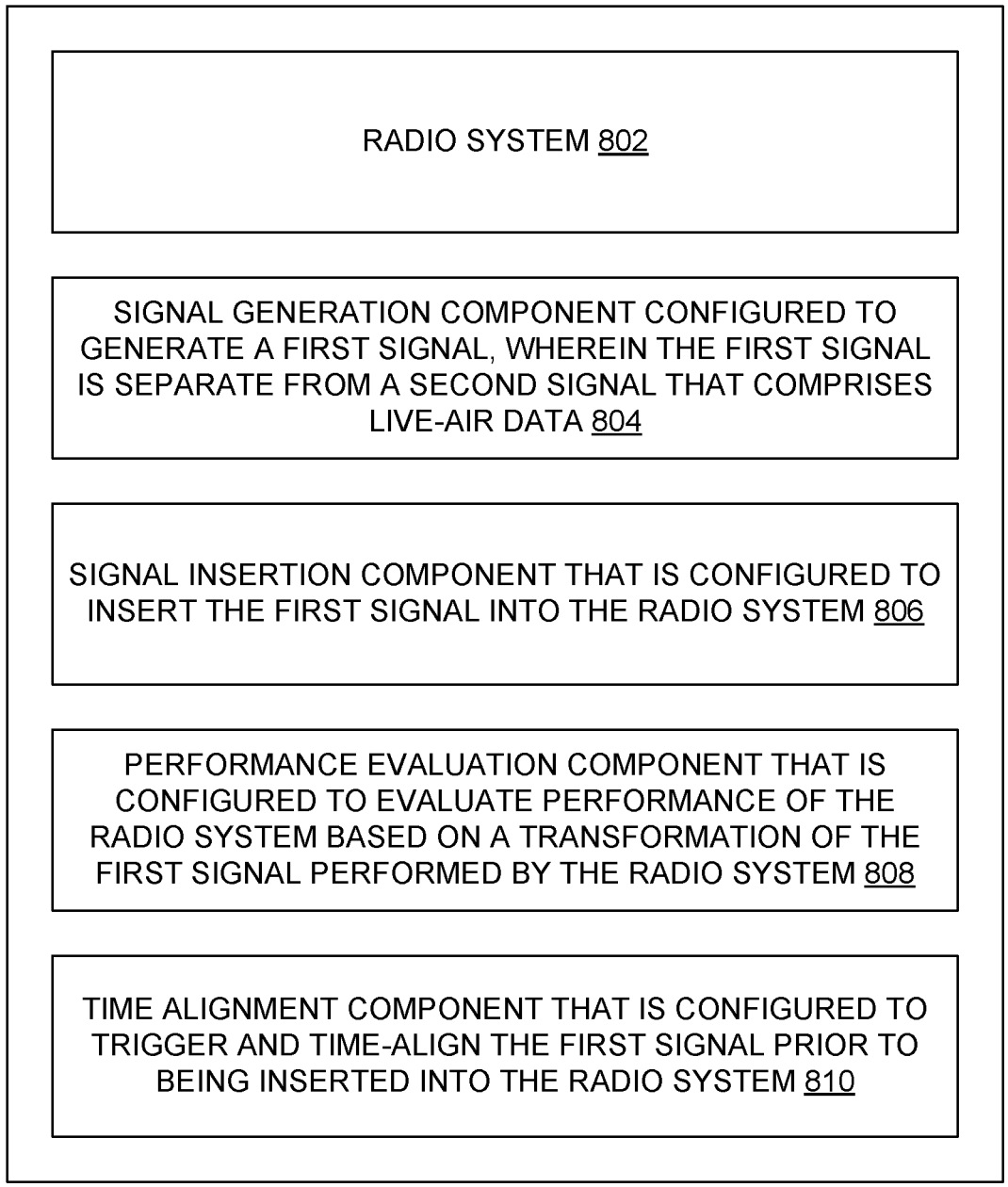
FIG. 8 illustrates another example system architecture that can facilitate custom signal data generation in a radio system, in accordance with an embodiment of this disclosure.

FIG. 8 illustrates another example system architecture 800 that can facilitate custom signal data generation in a radio system, in accordance with an embodiment of this disclosure. In some examples, part(s) of system architecture 800 can be used to implement part(s) of system architecture 100 of FIG. 1, system architecture 200 of FIG. 2, system architecture 300 of FIG. 3, system architecture 400 of FIG. 4, and/or system architecture 500 of FIGS. 5A-D.

System architecture 800 comprises radio system 802 (which can be similar to radio system 702 of FIG. 7); signal generation component configured to generate a first signal, wherein the first signal is separate from a second signal that comprises live-air data 804 (which can be similar to signal generation component configured to generate a first signal, wherein the first signal is separate from a second signal that comprises live-air data 704); signal insertion component that is configured to insert the first signal into the radio system 806 (which can be similar to signal insertion component that is configured to insert the first signal into the radio system 706); performance evaluation component that is configured to evaluate performance of the radio system based on a transformation of the first signal performed by the radio system 808 (which can be similar to performance evaluation component that is configured to evaluate performance of the radio system based on a transformation of the first signal performed by the radio system 708); and time alignment component that is configured to trigger and time-align the first signal prior to being inserted into the radio system 810.

In some examples, time alignment component that is configured to trigger and time-align the first signal prior to being inserted into the radio system 810 can be similar to time alignment 118 of FIG. 1, and/or time alignment 318 of FIG. 3.

In some examples, time alignment component that is configured to trigger and time-align the first signal prior to being inserted into the radio system 810 is configured to time-align the first signal on a symbol-by-symbol basis in the frequency domain.

Figure 9:
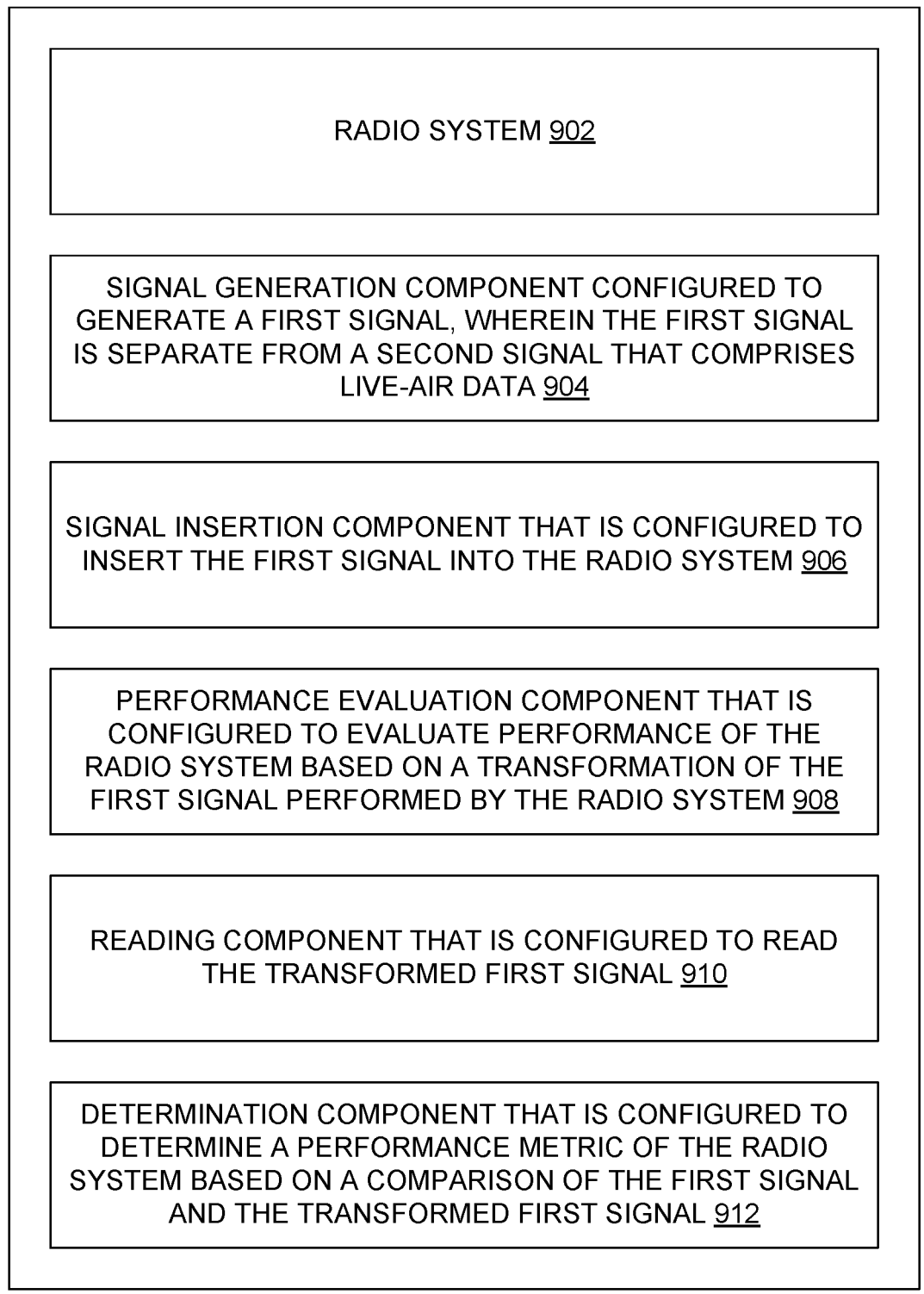
FIG. 9 illustrates another example system architecture that can facilitate custom signal data generation in a radio system, in accordance with an embodiment of this disclosure.

FIG. 9 illustrates another example system architecture 900 that can facilitate custom signal data generation in a radio system, in accordance with an embodiment of this disclosure. In some examples, part(s) of system architecture 900 can be used to implement part(s) of system architecture 100 of FIG. 1, system architecture 200 of FIG. 2, system architecture 300 of FIG. 3, system architecture 400 of FIG. 4, and/or system architecture 500 of FIGS. 5A-D.

System architecture 900 comprises radio system 902 (which can be similar to radio system 702 of FIG. 7); signal generation component configured to generate a first signal, wherein the first signal is separate from a second signal that comprises live-air data 904 (which can be similar to signal generation component configured to generate a first signal, wherein the first signal is separate from a second signal that comprises live-air data 704); signal insertion component that is configured to insert the first signal into the radio system 906 (which can be similar to signal insertion component that is configured to insert the first signal into the radio system 706); performance evaluation component that is configured to evaluate performance of the radio system based on a transformation of the first signal performed by the radio system 908 (which can be similar to performance evaluation component that is configured to evaluate performance of the radio system based on a transformation of the first signal performed by the radio system 708); reading component that is configured to read the transformed first signal 910; and determination component that is configured to determine a performance metric of the radio system based on a comparison of the first signal and the transformed first signal 912.

In some examples, reading component that is configured to read the transformed first signal 910 can be similar to analysis 514A, analysis 514B, and/or analysis 514C of FIGS. 5A-D. In some examples, determination component that is configured to determine a performance metric of the radio system based on a comparison of the first signal and the transformed first signal 912 can be similar to analysis 514A, analysis 514B, and/or analysis 514C of FIGS. 5A-D.

That is, determination component that is configured to determine a performance metric of the radio system based on a comparison of the first signal and the transformed first signal 912 can compare a custom signal as injected into a radio system with a version of that signal that is read after it has traveled through some portion of the radio system. By measuring how the signal has changed when traveling through that portion of the radio system, determination component that is configured to determine a performance metric of the radio system based on a comparison of the first signal and the transformed first signal 912 can evaluate performance of the radio system.

In some examples, determination component 912 is configured to determine the performance metric based on live-air data of the radio system. That is, in addition to evaluating system performance based on custom signal injection, determination component can also evaluate system performance based on how live-air data of the radio system changes (or does not change) in traveling through at least a portion of the radio system.

Figure 10:
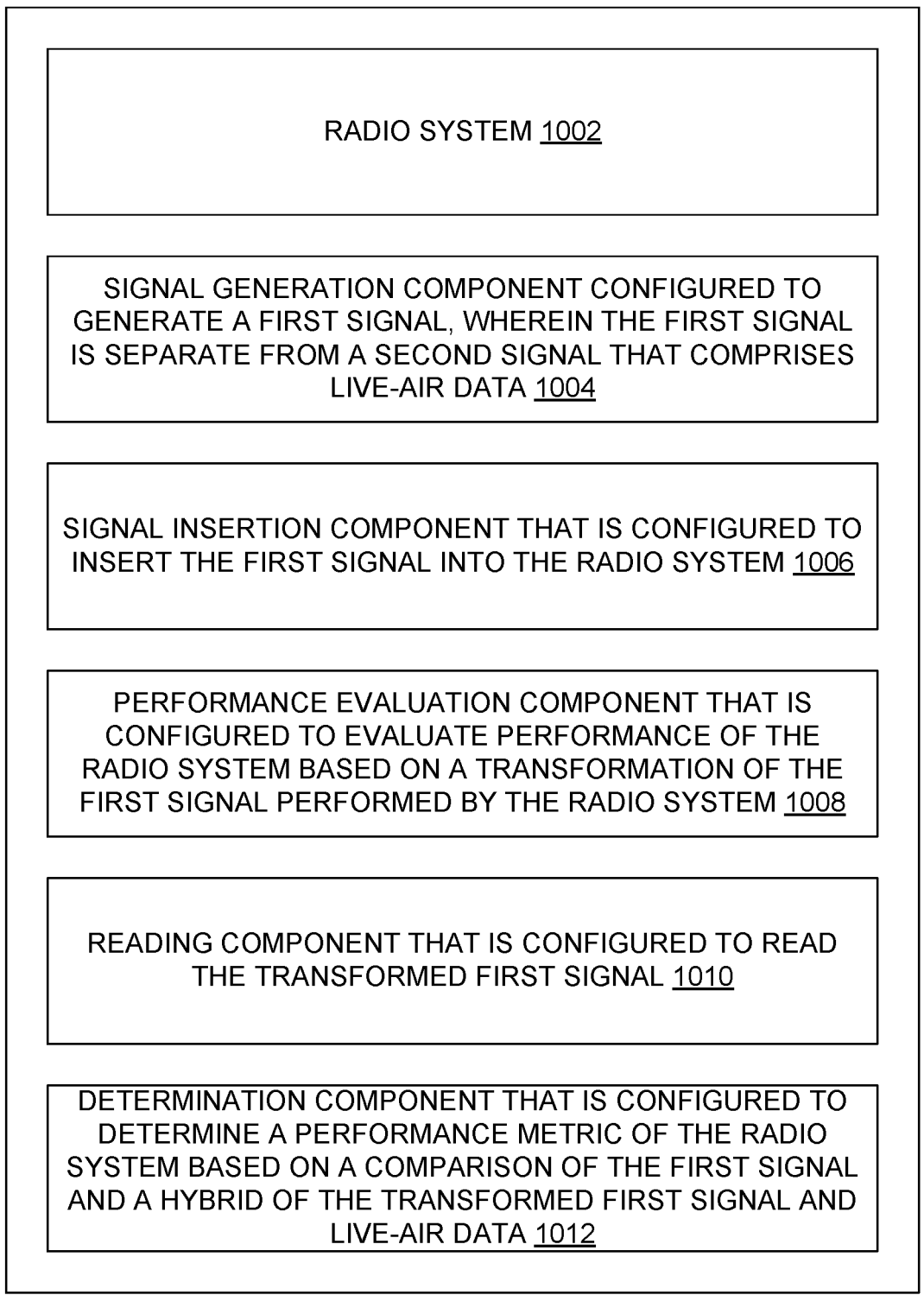
FIG. 10 illustrates another example system architecture that can facilitate custom signal data generation in a radio system, in accordance with an embodiment of this disclosure.

FIG. 10 illustrates another example system architecture 1000 that can facilitate custom signal data generation in a radio system, in accordance with an embodiment of this disclosure. In some examples, part(s) of system architecture 1000 can be used to implement part(s) of system architecture 100 of FIG. 1, system architecture 200 of FIG. 2, system architecture 300 of FIG. 3, system architecture 400 of FIG. 4, and/or system architecture 500 of FIGS. 5A-D.

System architecture 1000 comprises radio system 1002 (which can be similar to radio system 702 of FIG. 7); signal generation component configured to generate a first signal, wherein the first signal is separate from a second signal that comprises live-air data 1004 (which can be similar to signal generation component configured to generate a first signal, wherein the first signal is separate from a second signal that comprises live-air data 704); signal insertion component that is configured to insert the first signal into the radio system 1006 (which can be similar to signal insertion component that is configured to insert the first signal into the radio system 706); performance evaluation component that is configured to evaluate performance of the radio system based on a transformation of the first signal performed by the radio system 1008 (which can be similar to performance evaluation component that is configured to evaluate performance of the radio system based on a transformation of the first signal performed by the radio system 708); reading component that is configured to read the transformed first signal 1010 (which can be similar to reading component that is configured to read the transformed first signal 910 of FIG. 9); and determination component that is configured to determine a performance metric of the radio system based on a comparison of the first signal and a hybrid of the transformed first signal and live-air data 1012.

In some examples, determination component that is configured to determine a performance metric of the radio system based on a comparison of the first signal and a hybrid of the transformed first signal and live-air data 1012 can be similar to analysis 514A, analysis 514B, and/or analysis 514C of FIGS. 5A-D. In some examples, the radio system combines custom signal data with live-air data to produce hybrid data, and determination component can evaluate performance of the radio system based on how the hybrid data changes as it travels through at least part of the radio system.

Example Process Flows

FIG. 11 illustrates an example process flow 1100 that can facilitate custom signal data generation in a radio system, in accordance with an embodiment of this disclosure. In some examples, one or more embodiments of process flow 1100 can be implemented by system architecture 100 of FIG. 1, system architecture 200 of FIG. 2, system architecture 300 of FIG. 3, system architecture 400 of FIG. 4, and/or system architecture 500 of FIGS. 5A-D.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1200 of FIG. 12, process flow 1300 of FIG. 13, and/or process flow 1400 of FIG. 14.

Process flow 1100 begins with 1102, and moves to operation 1104. Operation 1104 depicts selecting a first signal from a memory that is configured to store and retrieve a second signal, a generator that is configured to generate first in-phase, quadrature sub-carrier values, a look up table that stores predetermined second in-phase, quadrature sub-carrier values, and a pseudo-random look up table generator that is configured to operate on the predetermined second in-phase, quadrature sub-carrier values to produce a pseudo-random symbol of data values.

That is, in some examples, the signal can be selected from look up table 102; pseudo-random look up table generator 104; generator 106; and memory 108 of FIG. 1. In some examples, the signal can be selected from look up table 302; pseudo-random look up table generator 304; generator 306; and memory 308 of FIG. 3.

In some examples, the predetermined second in-phase, quadrature sub-carrier values represent respective components of a constellation of a respective modulation coding scheme level. That is, the look up table can store values of this type.

In some examples, the pseudo-random look up table generator is configured to select values from the look up table randomly to generate a resource block matrix symbol of signal data.

In some examples, the generator is configured to generate signed data pairs of arbitrary sub carrier values for a selected multi carrier system.

In some examples, data representing the first signal comprises live-air signal data representing a live-air signal used by the radio system. In some examples, the first signal comprises custom-only data that is maintained separate from live-air signal data representing a live-air signal used by the radio system. That is, live-air data can be used according to the present techniques, by itself, and/or in a hybrid with an injected custom signal.

After operation 1104, process flow 1100 moves to operation 1106.

Operation 1106 depicts injecting the first signal into a radio system. In some examples, this can be performed by tap point select 132 of FIG. 1; tap point select 132 of FIG. 2; scheduler 322 of FIG. 3; and/or scheduler 422 of FIG. 4.

After operation 1106, process flow 1100 moves to 1108, where process flow 1100 ends.

Figure 12:
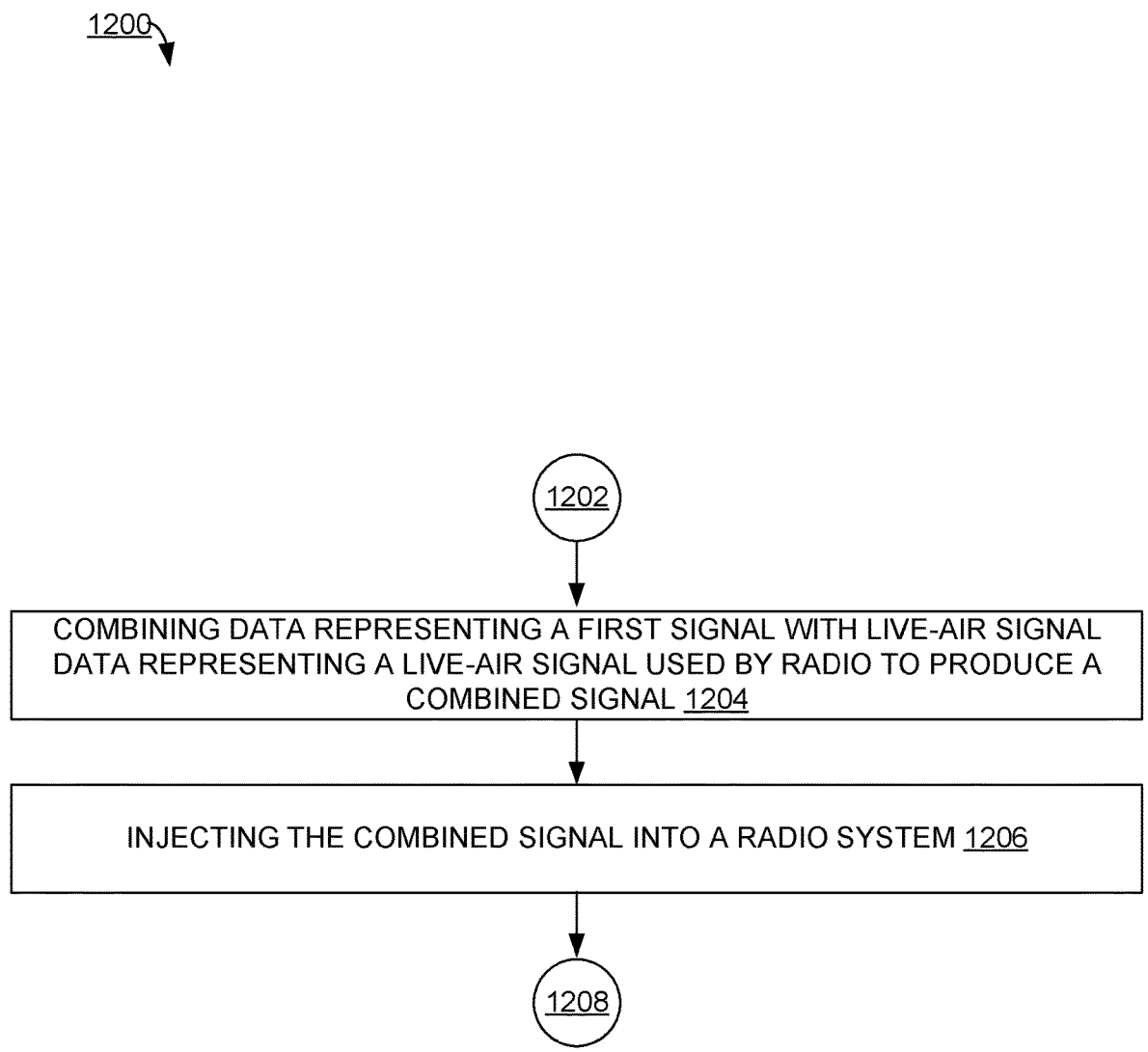
FIG. 12 illustrates another example process flow that can facilitate custom signal data generation in a radio system, in accordance with an embodiment of this disclosure.

FIG. 12 illustrates another example process flow 1200 that can facilitate custom signal data generation in a radio system, in accordance with an embodiment of this disclosure. In some examples, one or more embodiments of process flow 1200 can be implemented by system architecture 100 of FIG. 1, system architecture 200 of FIG. 2, system architecture 300 of FIG. 3, system architecture 400 of FIG. 4, and/or system architecture 500 of FIGS. 5A-D.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, process flow 1300 of FIG. 13, and/or process flow 1400 of FIG. 14.

Process flow 1200 begins with 1202, and moves to operation 1204. Operation 1204 depicts combining data representing a first signal with live-air signal data representing a live-air signal used by radio to produce a combined signal. That is, a custom signal can be combined with actual live-air data for injection into the radio system.

After operation 1204, process flow 1200 moves to operation 1206.

Operation 1206 depicts injecting the combined signal into a radio system. In some examples, this can be performed by tap point select 132 of FIG. 1; tap point select 132 of FIG. 2; scheduler 322 of FIG. 3; and/or scheduler 422 of FIG. 4.

After operation 1206, process flow 1200 moves to 1208, where process flow 1200 ends.

FIG. 13 illustrates another example process flow 1300 that can facilitate custom signal data generation in a radio system, in accordance with an embodiment of this disclosure. In some examples, one or more embodiments of process flow 1300 can be implemented by system architecture 100 of FIG. 1, system architecture 200 of FIG. 2, system architecture 300 of FIG. 3, system architecture 400 of FIG. 4, and/or system architecture 500 of FIGS. 5A-D.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1100 of FIG. 11, process flow 1200 of FIG. 12, and/or process flow 1400 of FIG. 14.

Process flow 1300 begins with 1302, and moves to operation 1304. Operation 1304 depicts reading a third signal from the radio system, wherein the third signal is generated based on the first signal. That is, where the first signal is a custom signal that is injected into a radio system, the third signal can be a version of that signal that is read elsewhere in the radio system, after the radio system has manipulated the first signal.

After operation 1304, process flow 1300 moves to operation 1306.

Operation 1306 depicts determining a performance metric of the radio system based on a comparison of the first signal and the third signal. In some examples, operation 1306 can be performed in a similar manner as analysis 514A, analysis 514B, and/or analysis 514C of FIGS. 5A-D.

After operation 1306, process flow 1300 moves to 1308, where process flow 1300 ends.

Figure 14:
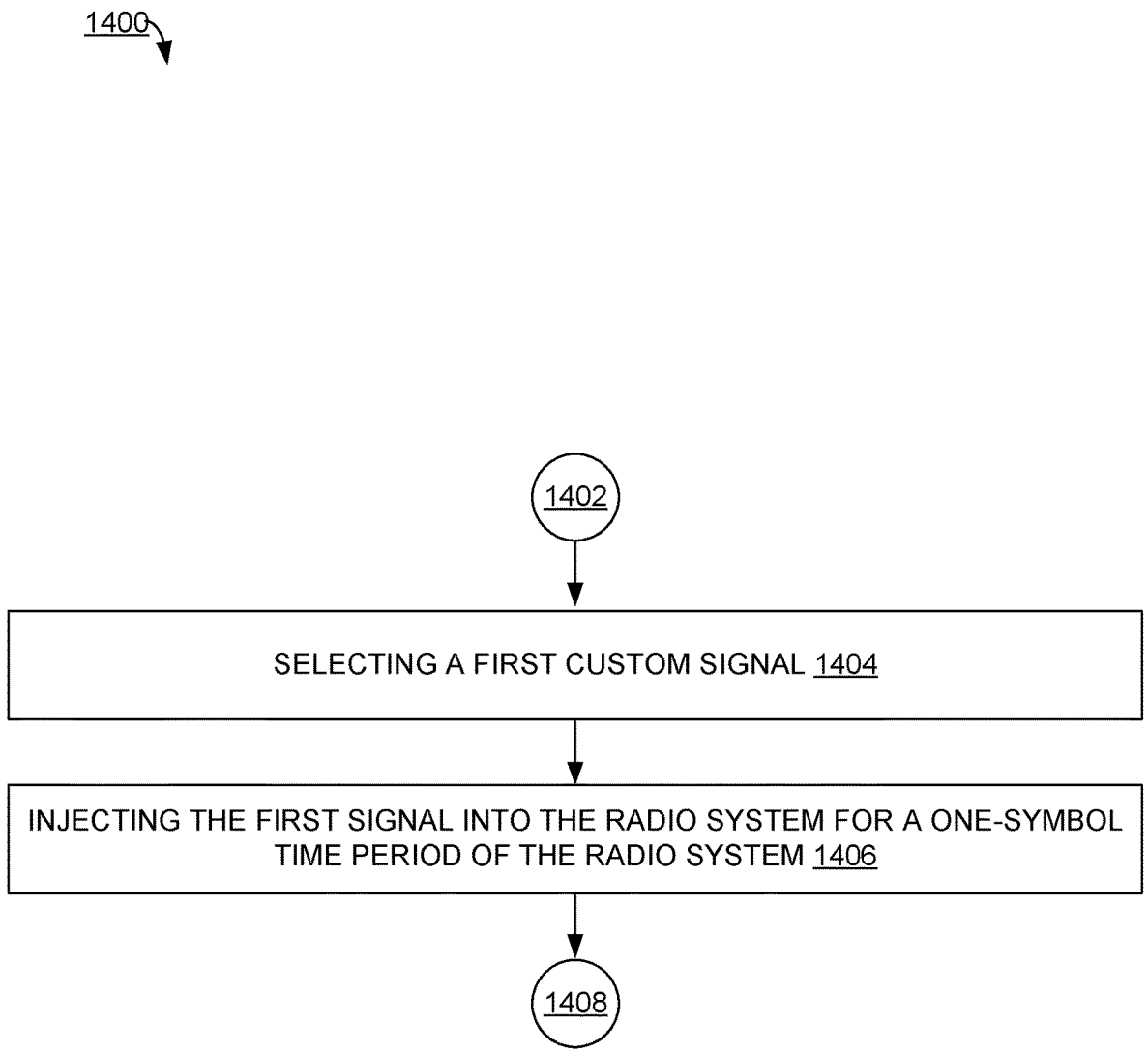
FIG. 14 illustrates another example process flow that can facilitate custom signal data generation in a radio system, in accordance with an embodiment of this disclosure.

FIG. 14 illustrates another example process flow 1400 that can facilitate custom signal data generation in a radio system, in accordance with an embodiment of this disclosure. In some examples, one or more embodiments of process flow 1400 can be implemented by system architecture 100 of FIG. 1, system architecture 200 of FIG. 2, system architecture 300 of FIG. 3, system architecture 400 of FIG. 4, and/or system architecture 500 of FIGS. 5A-D.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 1100 of FIG. 11, process flow 1200 of FIG. 12, and/or process flow 1300 of FIG. 13.

Process flow 1400 begins with 1402, and moves to operation 1404. Operation 1404 depicts selecting a first custom signal. That is, in some examples, the first custom signal can be selected from one (or a combination of) look up table 102; pseudo-random look up table generator 104; generator 106; and/or memory 108 of FIG. 1; or look up table 302; pseudo-random look up table generator 304; generator 306; memory 308 of FIG. 3.

After operation 1404, process flow 1400 moves to operation 1406.

Operation 1406 depicts injecting the first signal into the radio system for a one-symbol time period of the radio system. That is, in some examples, in the frequency domain, custom signal injection can be performed for an arbitrary number of symbols, which can be as small as a one-symbol period.

After operation 1406, process flow 1400 moves to 1408, where process flow 1400 ends.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component.

One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory that is configured to store and retrieve a first signal;
   a generator that is configured to generate first in-phase, quadrature sub-carrier values;
   a look up table that stores predetermined second in-phase, quadrature sub-carrier values;
   a pseudo-random look up table generator that is configured to operate on the predetermined second in-phase, quadrature sub-carrier values to produce a pseudo-random symbol of data values;
   a first component that is configured to time align, buffer, and inject a second signal into a radio used by the system, wherein the second signal is selected from the memory, the generator, the look up table, and the pseudo-random look up table generator;
   a second component that is configured to read a third signal from the radio system, wherein the third signal is generated based on the second signal; and
   a third component that is configured to determine a performance metric of the radio based on a comparison of the second signal and the third signal.

2. The system of claim 1, wherein the first component is configured to inject the second signal at a distributed unit of the radio used by the system.

3. The system of claim 1, wherein the first component is configured to mask at least part of the second signal before injecting the second signal into the radio.

4. The system of claim 1, wherein the first component is configured to align the second signal with a time boundary of the radio before injecting the second signal into the radio.

5. A method, comprising:
   selecting, by a system comprising at least one processor, a first signal from,
      a memory that is configured to store and retrieve a second signal,
      a generator that is configured to generate first in-phase, quadrature sub-carrier values,
      a look up table that stores predetermined second in-phase, quadrature sub-carrier values, and
      a pseudo-random look up table generator that is configured to operate on the predetermined second in-phase, quadrature sub-carrier values to produce a pseudo-random symbol of data values;
   injecting, by the system, the first signal into a radio system;
   reading, by the system, a third signal from the radio system, wherein the third signal is generated based on the first signal; and
   determining, by the system, a performance metric of the radio system based on a comparison of the first signal and the third signal.

6. The method of claim 5, wherein the predetermined second in-phase, quadrature sub-carrier values represent respective components of a constellation of a respective modulation coding scheme level.

7. The method of claim 5, wherein the pseudo-random look up table generator is configured to select values from the look up table randomly to generate a resource block matrix symbol of signal data.

8. The method of claim 5, wherein the generator is configured to generate signed data pairs of arbitrary sub carrier values for a selected multi carrier system.

9. The method of claim 5, further comprising:
   combining, by the system, data representing the first signal with live-air signal data representing a live-air signal used by the radio system.

10. The method of claim 5, wherein data representing the first signal comprises live-air signal data representing a live-air signal used by the radio system.

11. The method of claim 5, wherein the first signal comprises custom-only data that is maintained separate from live-air signal data representing a live-air signal used by the radio system.

12. The method of claim 5, further comprising:
   injecting, by the system, the first signal into the radio system for a one-symbol time period of the radio system.

13. An apparatus, comprising:
a radio system;
a signal generation component configured to generate a first signal, wherein the first signal is separate live-air data;
a signal insertion component that is configured to insert the first signal into the radio system; and
a performance evaluation component that is configured to evaluate performance of the radio system based on a transformation of the first signal performed by the radio system, to produce a second signal, and wherein the performance evaluation component comprises,
a reading component that is configured to read the second signal; and
a determination component that is configured to determine a performance metric of the radio system based on a comparison of the first signal and the second signal.

14. The apparatus of claim 13, further comprising:
a time alignment component that is configured to trigger and time-align the first signal prior to being inserted into the radio system.

15. The apparatus of claim 14, wherein the time alignment component is configured to time-align the first signal on a symbol-by-symbol basis in the frequency domain.

16. The apparatus of claim 13, wherein the signal insertion component is configured to insert the first signal into the radio system in a frequency domain portion of a down link stream of a distributed unit of the radio system.

17. The apparatus of claim 13, wherein the determination component is configured to determine the performance metric based on live-air data of the radio system.

18. The apparatus of claim 13, wherein
the determination component is configured to determine the performance metric of the radio system based on the comparison of the first signal and a hybrid of the transformed first signal and live-air data.

19. The system of claim 1, wherein the third component is configured to determine the performance metric of the radio system based on the comparison of the second signal and a hybrid of the third signal and live-air data.

20. The method of claim 5, wherein the determining of the performance metric is based on a comparison of the first signal and a hybrid of the third signal and live-air data.

* * * * *